(12) United States Patent
Lenneman et al.

(10) Patent No.: US 8,255,123 B2
(45) Date of Patent: Aug. 28, 2012

(54) APPARATUS AND METHOD FOR POSITIONING A MOVABLE COMPONENT OF A MOTOR ACTUATED DEVICE

(75) Inventors: John K. Lenneman, Okemos, MI (US); Joseph F. Szczerba, Grand Blanc, MI (US); Roy J. Mathieu, Rochester Hills, MI (US); Brian S. Repa, Beverly Hills, MI (US); Thomas A. Seder, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 954 days.

(21) Appl. No.: 11/768,993

(22) Filed: Jun. 27, 2007

(65) Prior Publication Data

US 2009/0002184 A1 Jan. 1, 2009

(51) Int. Cl.
*G05D 3/00* (2006.01)
(52) U.S. Cl. .......................................... 701/49; 340/665
(58) Field of Classification Search .................. 340/665, 340/666, 667; 701/45, 49
See application file for complete search history.

(56) References Cited

U.S. PATENT DOCUMENTS

| 4,593,403 | A | * | 6/1986 | Kishi et al. .................... 704/243 |
| 4,797,924 | A | | 1/1989 | Schnars et al. |
| 5,214,707 | A | | 5/1993 | Fujimoto et al. |
| 5,319,248 | A | | 6/1994 | Endou |
| 5,670,853 | A | * | 9/1997 | Bauer ............................ 318/286 |
| 6,055,473 | A | | 4/2000 | Zwolinski et al. |
| 6,198,244 | B1 | | 3/2001 | Hayden et al. |
| 6,220,667 | B1 | | 4/2001 | Wagner |
| 6,230,138 | B1 | | 5/2001 | Everhart |
| 6,490,515 | B1 | * | 12/2002 | Okamura et al. ............... 701/49 |
| 6,578,917 | B1 | * | 6/2003 | Aubert et al. .................. 297/317 |
| 6,830,123 | B2 | * | 12/2004 | Ohki et al. ..................... 180/326 |
| 2002/0102002 | A1 | * | 8/2002 | Gersabeck et al. ............ 381/110 |
| 2002/0161501 | A1 | * | 10/2002 | Dulin et al. ..................... 701/45 |
| 2002/0173892 | A1 | | 11/2002 | Oh |
| 2003/0011337 | A1 | * | 1/2003 | Pavlov .......................... 318/466 |
| 2005/0072618 | A1 | * | 4/2005 | Gray et al. ..................... 180/274 |

FOREIGN PATENT DOCUMENTS

CN 2857917 Y 1/2007

* cited by examiner

*Primary Examiner* — Khoi Tran
*Assistant Examiner* — Stephen Holwerda

(57) ABSTRACT

An apparatus and method are disclosed for positioning a movable component of a motor actuated device. The apparatus for carrying out the method includes a speech sensor for receiving speech input provided by a user of the device, and a force sensor for measuring a force input provided by the device user. The apparatus further includes a controller coupled to the speech sensor, the force sensor, and the motor actuated vehicle accessory, where the controller is operable to position the movable component in accordance with the received speech input and the measured force input. Exemplary embodiments are presented where the principles of the disclosure are applied to adjust the positioning of movable components of an adjustable pedal assembly and a vehicle power seat.

29 Claims, 8 Drawing Sheets

APPARATUS AND METHOD FOR POSITIONING A MOVABLE COMPONENT OF A MOTOR ACTUATED DEVICE

TECHNICAL FIELD

The present disclosure relates to an apparatus and method for positioning a movable component of a motor actuated device.

BACKGROUND OF THE INVENTION

Over the past several years, the number and type of motor actuated accessories in vehicles has been steadily increasing. Power windows, power mirrors, power seats, power adjustable pedal assemblies, and numerous other kinds of electric motor actuated devices are now common place in vehicles. This had led to an increase in the number and complexity of manually operated electrical contact switches required in vehicle cockpits to enable adjustment in the positioning of the movable components of such motor actuated devices.

The placement and location of these manual switches can present difficulties to vehicle designers, and over extended periods of use, the performance of the switches can deteriorate. In addition, such switches are sometimes used to provide multiple switching functions for controlling different motor actuated accessories, which can be confusing to the users of such devices.

Accordingly, a more intuitive and user-friendly apparatus and method and for adjusting the positioning of movable components of motor actuated devices that do not require the use of manually operated electrical contact switches may be desired.

SUMMARY OF THE INVENTION

An apparatus for positioning a movable component of a device, where the device has a motor actuator for adjusting the position of the movable component, includes a speech sensor for receiving a speech input provided by a user of the device, a force sensor for measuring a force input applied by the user of the device, and a controller coupled to the speech sensor and the force sensor, the controller being operable to drive the motor actuator to adjust positioning of the movable component in accordance with the speech input and the force input.

BRIEF DESCRIPTION OF THE DRAWINGS

Embodiments will now be described in the following detailed description with reference to the accompanying drawings. Like reference characters designate like or similar elements throughout the drawings in which.

DESCRIPTION OF TIE PREFERRED EMBODIMENT(S)

Figure 1:
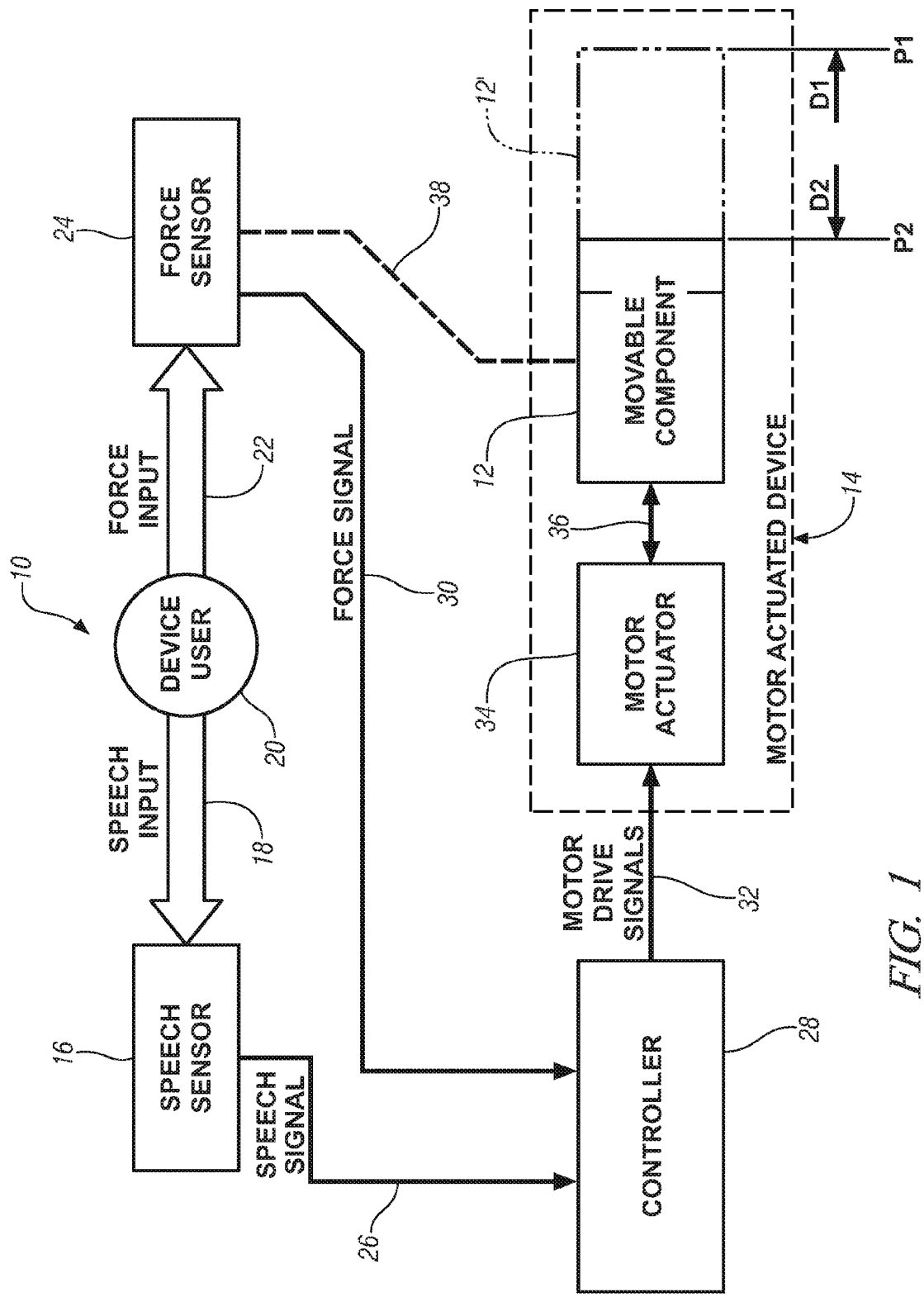
FIG. 1 is a schematic diagram illustrating an exemplary embodiment.

Referring now to FIG. 1, there is shown schematically an exemplary apparatus, generally designated by numeral 10, for positioning a movable component 12 of a motor actuated device 14.

The apparatus 10 includes a speech sensor 16 for sensing speech input 18 provided by a user 20 of the device 14, and a force sensor 24 for measuring a force input 22 provided by the device user 20. Speech sensor 16 generates a speech signal representative of the received speech input; while force sensor 24 generates a force signal representative of the magnitude of the force input 22 applied by device user 20.

Apparatus 10 further includes a controller 28 coupled to the speech sensor 16 and the force sensor 24 for receiving the speech and force signals via electrical conductors represented respectively by lines 26 and 30. Based upon these received speech and force signals, controller 28 operates to generate motor drive signals that are communicated to a motor actuator 34 of device 14 over electrical conductors represented by line 32. Motor actuator 34 includes an electric motor (not shown) such as a brushless DC motor, for example, which is coupled in a known fashion to adjustably position the movable component 12 of device 14.

Speech sensor 16 may be implemented by a single acoustic transducer, such as a microphone, or by other known speech input circuitry, which may include multiple microphones, amplifiers, and/or echo cancellation circuitry, depending upon the requirements of the particular application. Force sensor 24 may be realized as a load cell, strain gauge, pressure sensor, torque sensor, or any other type of known sensor capable of measuring the force input 22, and generating a corresponding electrical signal indicative of the magnitude of the applied force input 22.

As indicated by dashed line 38, force sensor 24 may be mechanically coupled to, or structurally mounted in or on movable component 12 in applications where it is desirable that user 20 apply the force input 22 directly to the movable component 12. In other applications, force sensor 24 can alternatively be located for measuring a force input 22 that is not applied to the movable component 12.

As indicated by line 36, motor actuator 34 is mechanically, pneumatically, or otherwise coupled to movable component 12, thereby enabling adjustments of the position of movable component 12. As illustrated, the movable component 12 is adjustable between a first position P1 (shown by movable component 12' in phantom) and a second position P2, by linear translation in directions designated as D1 and D2.

In what follows, it will be recognized that the positioning of movable component 12 is not limited to linear translation, but may also include rotational or other types of translation. Accordingly, reference to the positions and directions of movement of movable component 12 will be understood to also broadly include rotational and other types of positions and directions of movement.

Figure 2:
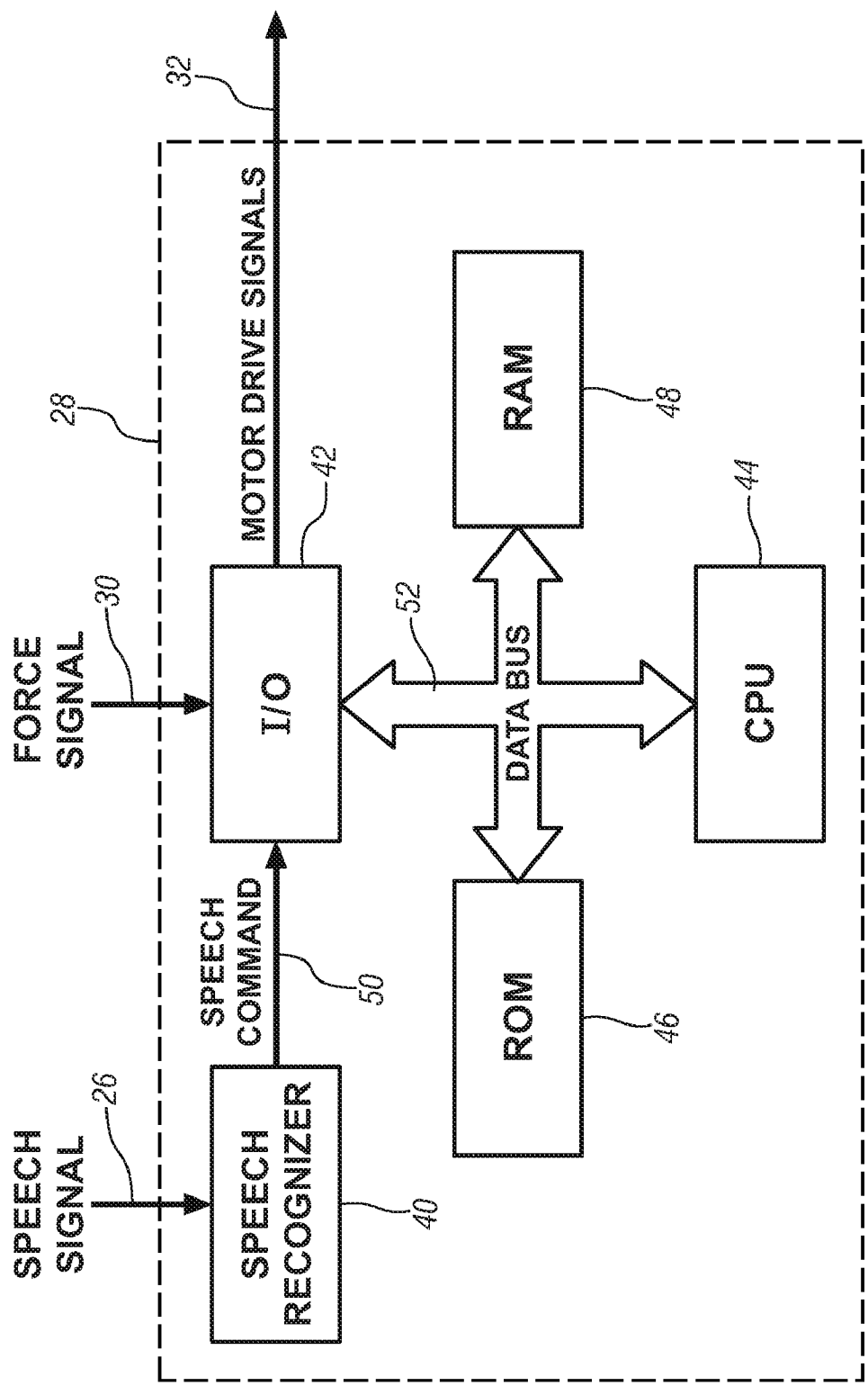
FIG. 2 is a diagram showing functional blocks of the controller depicted in the embodiment shown in FIG. 1.

FIG. 2 is an exemplary diagram illustrating functional blocks within the controller 28 of FIG. 1. As shown, controller 28 comprises a speech recognizer 40, input/output (I/O) circuitry 42, a central processing unit (CPU) 44, read only memory (ROM) 46, and random access memory (RAM) 48.

CPU 44 is electrically connected to I/O circuitry 42, ROM 46, and RAM 48 via a common electrical data bus represented by arrowed lines 52. Under the control of a software program stored in ROM 46, the CPU 44 reads data from and sends data to the I/O circuitry 42, stores data in and retrieves data from RAM 48, and performs arithmetic/logic operations on such data.

Speech recognizer 40 typically includes speech processing circuitry and a memory for storing speech data representing defined speech commands that can be input by the device user 20. The speech recognizer 40 receives the speech signal generated by speech sensor 16 via line 26, and operates in a known fashion to process the speech signal for comparison with stored speech data. In doing so, speech recognizer 40 is able to determine whether the device user 20 has spoken any of the stored defined speech commands. When one of the spoken speech commands is recognized by speech recognizer 40, speech command data identifying the recognized speech command is communicated via line 50 to the I/O circuitry 42.

The I/O circuitry 42 also receives the force signal generated by force sensor 24 on line 30, and provides corresponding sampled data that can be read by CPU 44 over the data bus 52. Under the control of CPU 44, the I/O circuitry 42 additionally provides the appropriate motor drive signals to motor actuator 34 over line 32 to effectuate adjustment of the position of movable component 12. As is well known in the art, the I/O circuitry 42 generally includes analog-to-digital (A/D), digital-to-analog (D/A), and other circuitry that enables controller 28 to communicate with such external sensors and motor actuators.

In accordance with a software program stored in ROM 46, CPU 44 operates to sequentially sample the force signal and read the speech command data communicated to the I/O circuitry 42, and then responsively determines the appropriate drive signals to be provided to motor actuator 34. In this fashion, controller 28 then operates to adjust the position of the movable component 12 of device 14 in accordance with the speech input 18 and force input 22 provided by the device user 20.

Figure 3A:
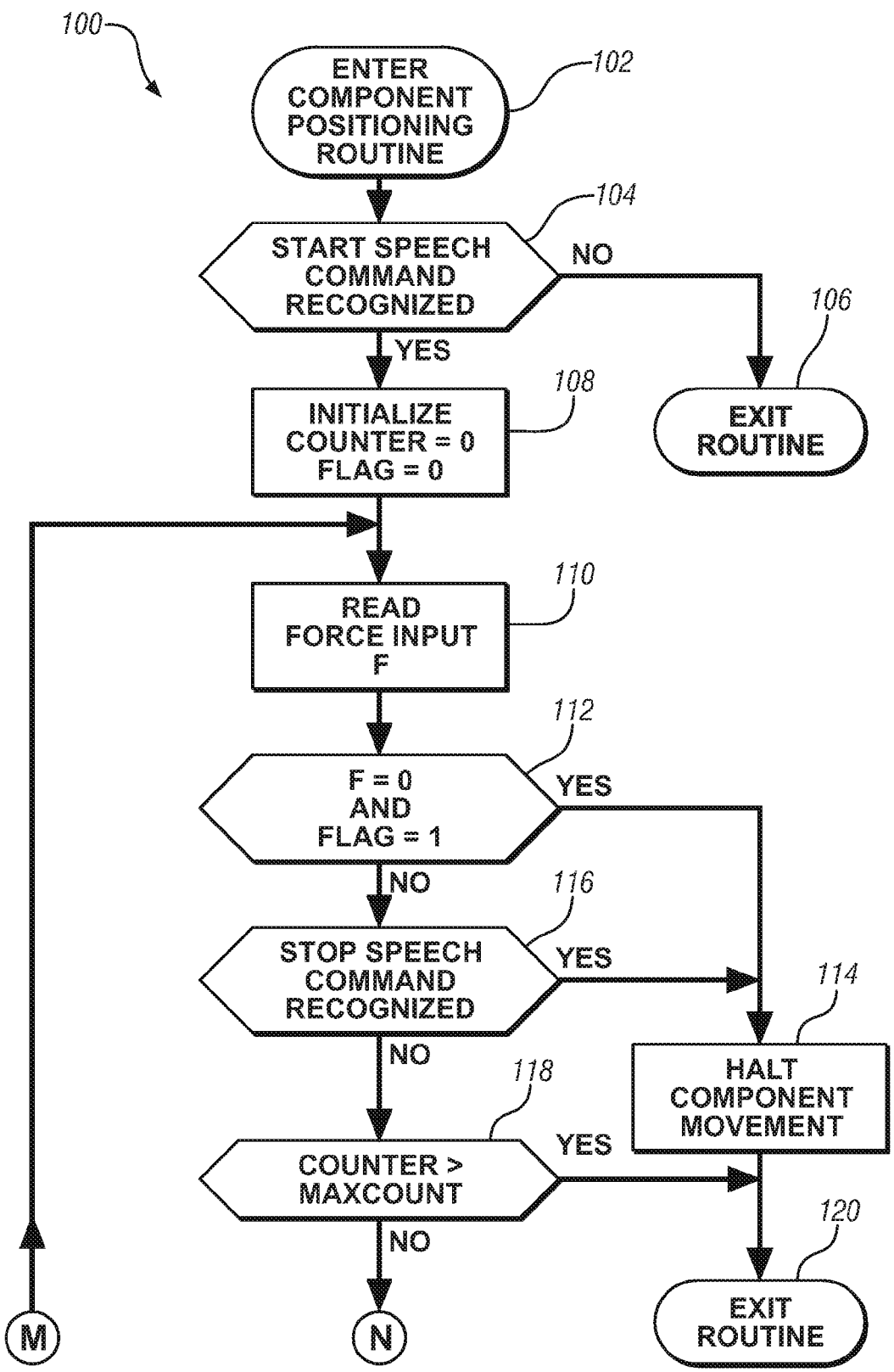
FIGS. 3A-3B shows a flow diagram illustrating operations carried out by the controller in the embodiment depicted in FIGS. 1 and 2.
Figure 3B:
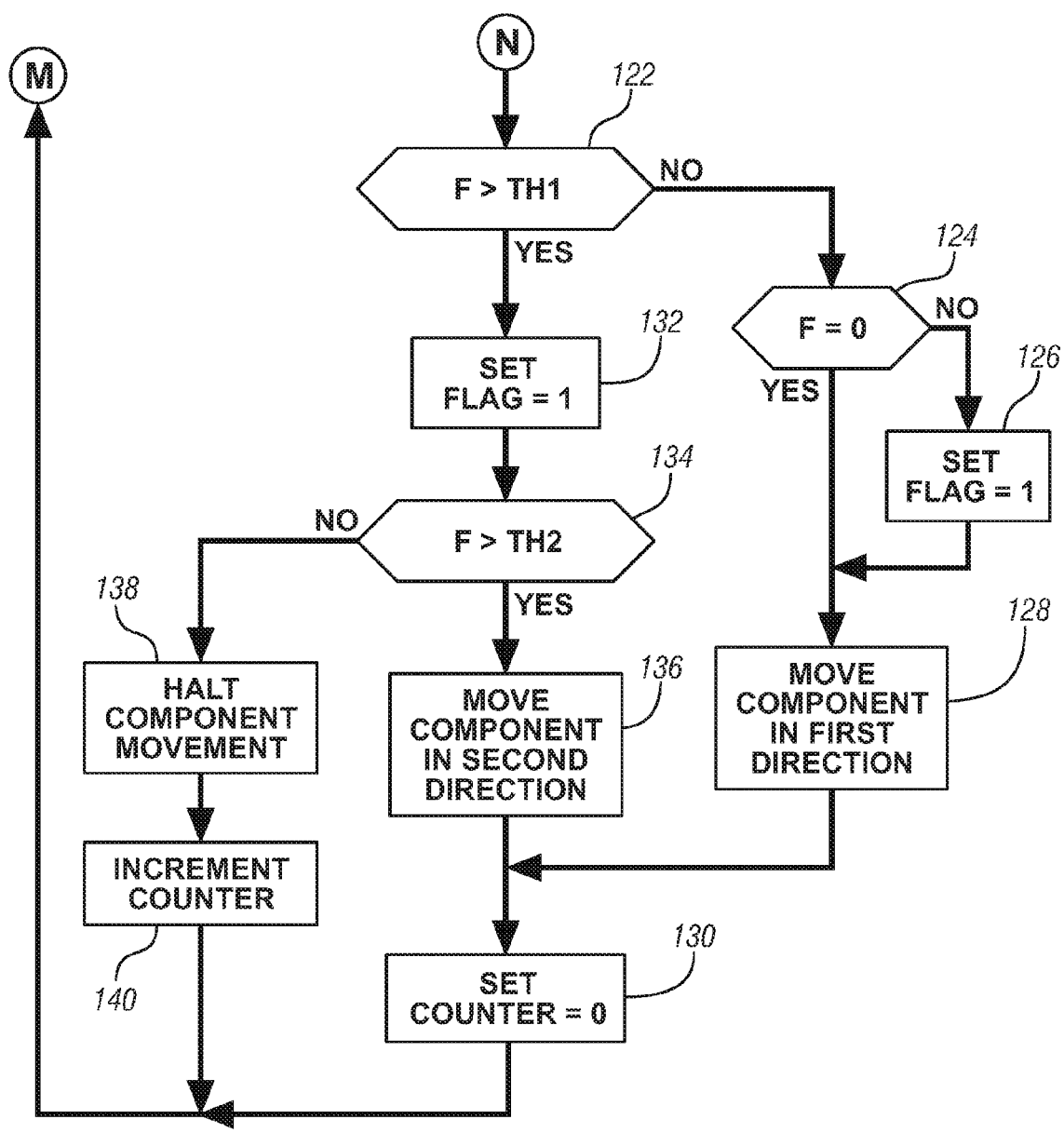

The general operations carried out by the software program stored in ROM 46 will now be described with reference to the exemplary flow diagram of component positioning routine 100 illustrated in FIGS. 3A-3B. Routine 100 may be implemented as one of a number of different component positioning routines in a continuously executed background program loop, thereby enabling controller 28 to adjust the positioning of movable components of any number of motor actuated devices.

Routine 100 is entered at 102 after electrical power is made available to energize apparatus 10, and the motor actuated device 14. From 102, the routine passes to 104.

At 104, CPU 44 reads the speech command data provided to I/O circuitry 42 to determine whether the user 20 has spoken a defined speech command that is required to be recognized before controller 28 starts or initiates adjustment of the positioning of component 12 (i.e., an adjustment activation command). If such a start speech command has not been recognized, the routine proceed to 106, where the routine is immediately exited. If the start speech command has been recognized, the routine proceeds to 108 to begin adjusting the position of the movable component 12 associated with the start speech command.

At 108, a counter variable and a flag variable that are subsequently used by the routine are initialized or set to have zero values in RAM 48, i.e., COUNTER=0, and FLAG=0. After initialization of these variables, the routine proceeds to 110.

At 110, CPU 44 reads the sampled data corresponding to the force signal provided by I/O circuitry 42, and then stores this data in RAM 48 as the value for the variable F that represents the magnitude of the force input 22 currently being applied by the device user 20.

From 110, the routine proceeds to decision 112, where a determination is made as to whether the variable F has a value of zero (F=0), and FLAG has a value of unity (FLAG=1). It will be understood from subsequent operations in the routine that once any amount of force input 22 is applied by user 20 (i.e., F>0), the routine will set the value of FLAG=1.

Accordingly, if user 20 has applied any amount of force input 22 (i.e., F>0) during prior operation of routine 100, and then removes the applied force input (i.e., F=0) as currently read at 110, the routine will pass from 112 to 114, where controller 28 sends the appropriate motor drive signals to motor actuator 34 to halt the movement of the movable component 12. From 114, the positioning routine 100 terminates by exiting at 120.

If the conditions of 112 are not satisfied (i.e., F=0 and FLAG=1), a decision will be made to proceed to 116.

At 116, CPU 44 reads the speech command data provided to I/O circuitry 42 to determine whether the user 20 has spoken a defined speech command used by controller 28 to terminate the adjustment of the positioning of movable component 12 (i.e., an adjustment deactivation command). If such a stop speech command has been recognized, the routine proceeds to 114, where controller 28 sends the appropriate motor drive signals to motor actuator 34 to halt the movement of the movable component 12. From 114, the routine is then exited at 120.

If a stop speech command has not been spoken by device user 20, the routine proceeds from 116 to 118, where the COUNTER variable is checked to determine whether its value is greater than a stored predetermined MAXCOUNT value. If COUNTER>MAXCOUNT, the routine immediately passes to 120, where the routine is exited. If COUNTER≦MAXCOUNT, then the routine proceeds to 122 (see FIG. 3B). The value of MAXCOUNT establishes a predetermined time period or timeout used to terminate and exit routine 100 under circumstances that will be subsequently described.

At 122, the magnitude of the force input F, which was previously read at 110, is compared to a predetermined amount of force TH1 (i.e., a first predetermined amount of force). If F>TH1, the routine proceeds to 132. If F≦TH1, the routine proceeds to 124.

At 124 a determination is made as to whether the magnitude of the force input F indicates that the device user 20 is currently not providing any force input 22, i.e., F=0. If F=0, the routine proceeds to 128. If F≠0, indicating that the device user 20 is currently applying a force input 22, the routine proceeds to 126 to set the value of FLAG=1, prior to passing to 128.

At 128, CPU 44 controls the I/O circuitry 42 to communicate the appropriate motor drive signals to motor actuator 34 to move the movable component 12 in the first direction D1 toward the first position P1 (see FIG. 1). Once initiated, the drive signals remain unchanged and the movement of moveable component 12 continues until the routine either halts movement or changes the direction of the movement. It will be recognized by those skilled in the art that if movable component 12 reaches the first position P1, the motor actuator 34 typically includes limit switches or the like (not shown) for automatically interrupting further movement in the first direction D1 to avoid damage to motor actuator 34.

From 128, the routine proceeds to 130, where the COUNTER variable is reset to have a zero value (i.e., COUNTER=0). From 130, the routine branches back to 110 (see FIG. 3A) to read a new value for the magnitude of the force input F to be used for the next pass through the loop beginning at 110.

As indicated previously, when the magnitude of the force input F at 122 is greater than the predetermined amount of force TH1, the routine proceeds to 132. At 132, the routine sets the value of FLAG=1, prior to passing to 134.

At 134, the magnitude of the force input F read previously at 110 is compared to a predetermined amount of force TH2 (i.e., a second predetermined amount of force). If F>TH2, the routine proceeds to 136. If F≦TH1, the routine proceeds to 138.

At 136, CPU 44 controls the I/O circuitry 42 to communicate the appropriate motor drive signals to motor actuator 34 to move the movable component 12 in the second direction D2 toward the second position P2 (see FIG. 1). As indicated previously, once movement is initiated in a particular direction, the drive signals remain unchanged and the movement of moveable component 12 continues until the routine either halts movement or changes the direction of the movement. If movable component 12 reaches the second position P2, it will be understood that motor actuator 34 typically will include limit switches or the like (not shown) for automatically interrupting further movement in the second direction D2 to avoid damage to motor actuator 34.

From 136, the routine proceeds to 130, where the COUNTER variable is reset to have a zero value (i.e., COUNTER=0). From 130 the routine branches back to 110 to read a new value for the magnitude of the force input F to be used for the next for the next pass through the loop beginning at 110.

As indicated previously, when the magnitude of the force input F≦TH2 at 134, the routine passes to 138, where controller 28 sends the appropriate motor drive signals to motor actuator 34 to halt the movement of the movable component 12.

From 138, the routine proceeds to 140, where the COUNTER variable is incremented by a value of one, i.e., COUNTER=COUNTER'+1, where COUNTER' represents the value of COUNTER just prior to the execution of 138. From 138 the routine branches back to 110 to read a new value for the magnitude of the force input F to be used for the next pass through the loop beginning at 110.

It will be understood from the above description of routine 100 that once a start command is recognized at 104, the magnitude of the force input 22 applied by device user 20 is used by controller 28 in determining whether or not movable component 12 is to be moved, and the direction of such movement.

If device user 20 does not apply any force input 22 (i.e., F=0), the routine will continuously execute 110, 116, 118, 122, 124, 128, and 130 to move movable component 12 in the first direction D1 until either a stop speech command for exiting the routine is recognized at 116, or movable component 12 reaches the first position D1.

If during the execution of the above 110, 116, 118, 122, 124, 128 and 130, the device user 20 applies a force input 22 such that the magnitude of the force F is less that the predetermined amount of force TH1, the routine then sets FLAG=1 by branching from 124 to 126. In this case, movable component 12 will then be the moved in the first direction D1 until: (i) the stop speech command is recognized at 116; (ii) the device user removes the applied force input 22 and the routine exits via 112; or (iii) the movable component 12 reaches the first position D1.

During the execution of the loop beginning at 110, if user 20 applies a force input 22 such that the magnitude of the force F is greater than the predetermined amount of force TH2, the routine passes through 134, 136, and 130 prior to branching back to 110. In this case, the movable component 12 will be moved in the second direction D2 until either: (i) the routine is exited via 112 when user 20 removes the applied force input 22; (ii) the routine is exited via 116 when a stop speech command is recognized; (iii) the movable component reaches the second position P2, or (iv) the device user 20 reduces the force input 22 such that the magnitude of F is greater than the first predetermined amount of force TH1, but less than or equal to the second predetermined amount of force TH2, which causes a branch from 134 to 138, where movement of the movable component 12 is halted.

If during the execution of the loop beginning at 110, the device user 20 applies and maintains a force input 22 such that the magnitude of F is greater than the first predetermined amount of force TH1, but less than or equal to the second predetermined amount of force TH2, 138 and 140 of the routine will be continuously executed, and movement of movable component 12 will be halted until the value of the COUNTER is incremented such that COUNT is greater than the MAXCOUNT, at which time the routine will then exit via 118. If the force input 22 is either increased such that F>TH2 or is decreased such that F≦TH1, while COUNT is less than or equal to MAXCOUNT, COUNT will be reset to zero, and movement of movable component 12 will resume in a direction as described above depending upon whether F≦TH1 or F>TH2. It will be recognized that the value of MAXCOUNT then establishes a predetermined time period or timeout for exiting the routine 100, when the device user 20 maintains the input force 22 in a predetermined range of force such that TH1<F≦TH2.

It will be understood that the present disclosure provides both a user friendly and intuitive means for adjusting the positioning of a movable component 12 of a motor actuated device 14 that does not require the use of electrical contact switches. Adjustment of the positioning of the movable component 12 is initiated by the device user 20 speaking a defined start speech command, and can be terminated if the device user: (i) issues a defined stop speech command; (ii) applies and then releases a force input 22 as measured by force sensor 24, or (ii) maintains the applied force input 22 in a predetermined range of force for more than a predetermined period of time. Once adjustment is initiated, device user 20 can vary an amount of applied force input 22 as measured by a force sensor 24 to change the direction of movement of movable component 12 to achieve a desired position.

It will also be understood that the selected values for TH1 and TH2 in the above routine 100 will generally depend upon the sensitivity of the force sensor 24. Typically, TH1 will have a value sufficiently less that the value of TH2 to provide a predetermined range for the force input 22 that the device user 20 can comfortably maintain for the time period established by the selected value of MAXCOUNT, when terminating the routine via 112. Additionally, values for TH1 and TH2 will usually be selected to establish the predetermined range of force TH1<F≦TH2 approximately midway between the minimum force input 22 detectable by force sensor 24, and the maximum force input 22 that can be comfortably applied by the device user 20.

Alternatively, the values of TH1 and TH2 can be selected to be equal so that both TH1 and TH2 represent a defined amount of force TH, i.e., TH1=TH2=TH. In this case, the termination feature provided by 118 will be eliminated from routine 100, along with 138 and 140. The controller 28 will then change the direction of movement of the movable component 12 depending upon whether the magnitude of F>TH1=TH2=TH or F≦TH1=TH2=TH. This alternative implementation may require the device user 20 to make the decision as to whether to terminate the routine by speaking a stop speech command or removing the force input 22, while movable component 12 is in motion. By selecting TH1 to have a value less than TH2, the device user 20 will have a predetermined time, during which movable component 12 is in a halted position, to decide whether additional adjustment is desirable before the routine is terminated.

It will also be understood that the force input 22 provided by the device user 20 does not have to be applied directly to the movable component 12. However, locating the force sensor 24 such that the force input 22 can be directly applied to the movable component 12 has advantages. The device user 20 is provided with immediate feedback with regard to the effect of the applied force input 22 on the positioning of the movable component 12. In addition, the force input 22 can be applied to oppose movement of movable component 12 in the first direction D1, and assist movement in the second direction D2. In doing so, it will be instinctive for the device user 20 to increase the magnitude of the applied input force 22 to reverse the direction of movement of movable component 12 as it moves too far in the first direction toward the device user 20. As will subsequently be described, applications exist, where it is not practical to locate the force sensor 24 on or in the movable component 12 due to the difficulty in applying the force input 22, or the complexity involved in the positioning adjustment of the movable component 12.

Different exemplary embodiments will now be presented with reference to FIGS. 4-7, where embodiments adjusting the position of moveable components of motor actuated vehicle accessory devices are illustrated.

Figure 4:
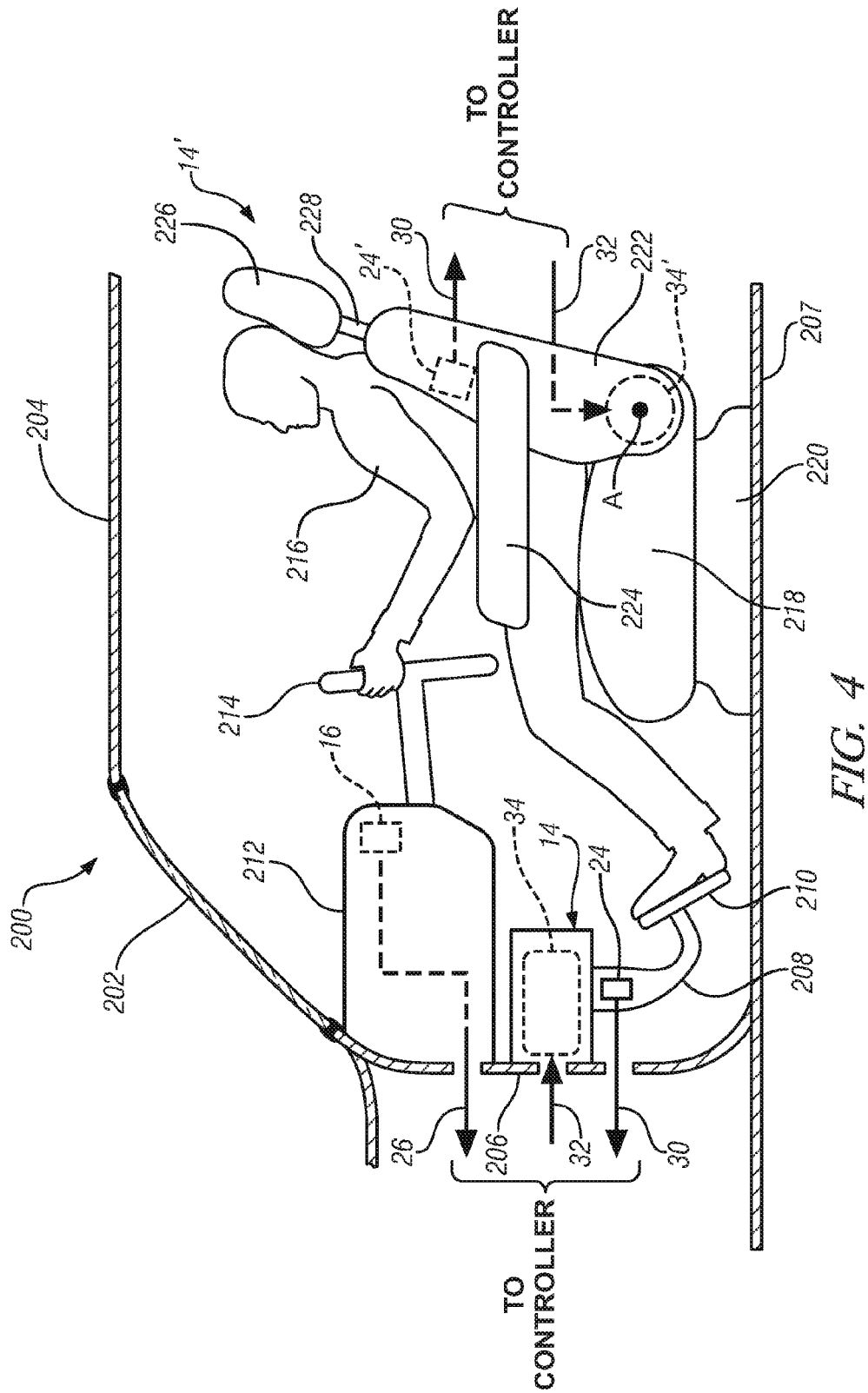
FIG. 4 illustrates exemplary embodiments implemented for positioning movable components of motor actuated vehicle accessories.

FIG. 4 illustrates the structure of a motor vehicle 200 having a roof section 204, a firewall section 206, and a floor section 207. A windshield glass 202 is shown disposed between the roof section 204 and the firewall section 206. Vehicle 200 further includes a vehicle dashboard 212, and a steering wheel 214 used by vehicle occupant 216 for operating vehicle 200. FIG. 4 further illustrates two motor actuated vehicle accessory devices, namely an adjustable pedal assembly designated by the numeral 14, and a power seat designated by the numeral 14'. These vehicle accessory devices are known in the art, and each will be employed in illustrating exemplary embodiments in the following description.

Adjustable pedal assembly 14 is typically mounted to vehicle 200 by way of firewall section 206, while vehicle power seat 14' is typically mounted to slide horizontally on rail 220 that attaches to the vehicle floor section 207. The adjustable pedal assembly 14 and the power seat 14' are each shown as respectively including representative motor actuators 34 and 34', and force sensors 24 and 24' that are coupled to controller 28 by way of conductors 32 and 30. Additionally, a speech sensor, implemented by way of a microphone 16, is shown mounted in vehicle dashboard 212 to receive speech input 18 provided by vehicle occupant 216. Microphone 16 is coupled to controller 18 by way of electrical conductors indicated by line 26. It will be understood that the shown location for microphone 16 is exemplary, and it can easily be disposed at alternative locations in vehicle 200, depending upon the particular application.

Adjustable pedal assembly 14 further includes a pedal arm 208, with attached pedal pad 210. Although not shown, it will be understood that adjustable pedal assembly 14 will typically include two or more such pedal arms and pads for causing acceleration, braking, and in some instances clutching inputs by way of the foot of vehicle occupant 216. The force sensor 24 is shown mounted on pedal arm 208 for measuring force input 22 applied by the foot of vehicle occupant 216 to the pedal pad 210. For this embodiment, force sensor 24 can be implemented as a strain gauge for measuring the amount of strain introduced in pedal arm 208 by application of the force input 22 applied by vehicle occupant 216.

Figure 5:
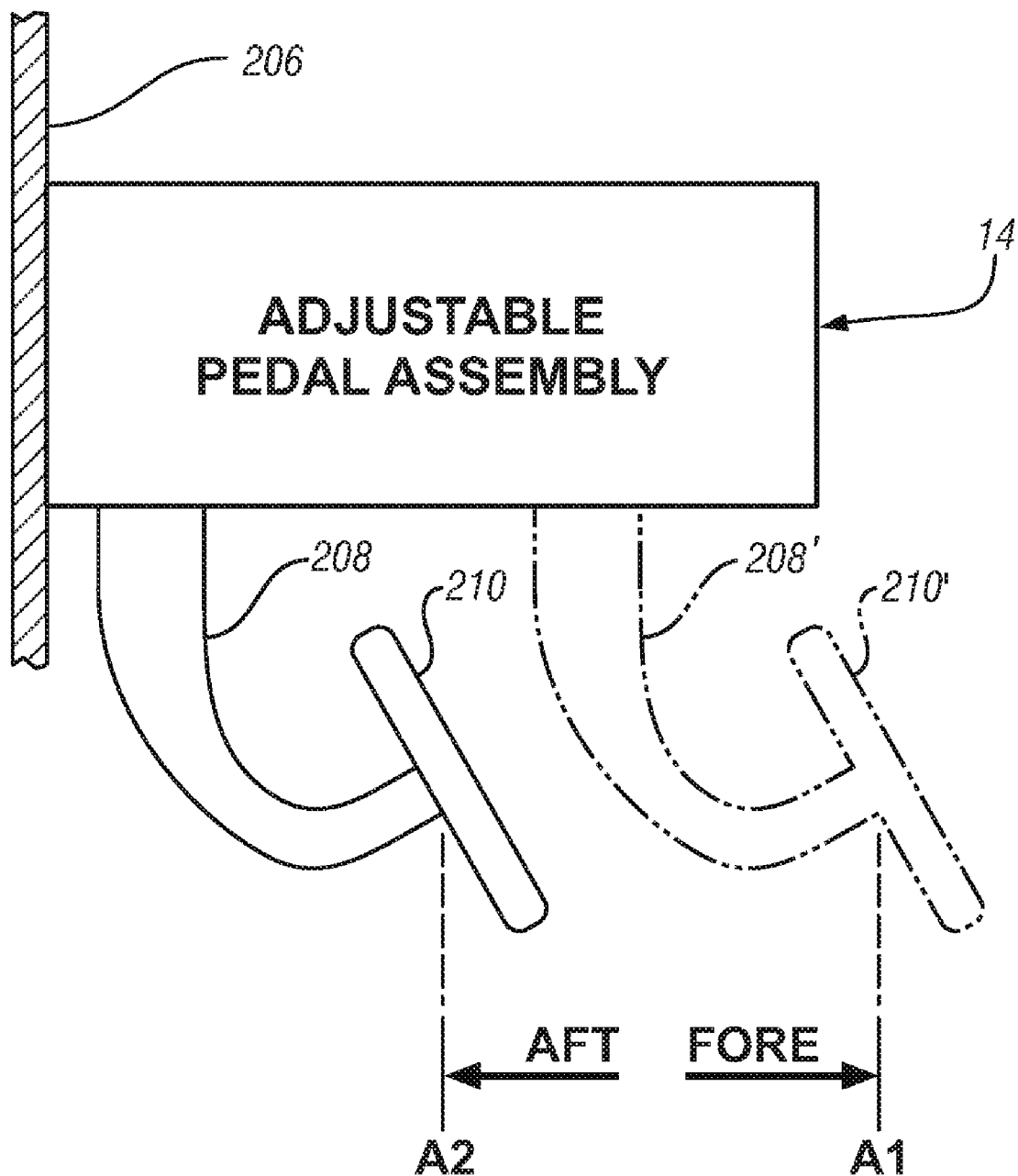
FIG. 5 illustrates movement of a vehicle adjustable pedal assembly positioned in an exemplary embodiment.

FIG. 5 illustrates movement of pedal arm 208 by motor actuator 34 in the indicated fore and aft directions, between a first position A1 (shown in phantom) and a second position A2, for accommodating different sized vehicle occupants 216.

Operation of this exemplary embodiment begins by vehicle occupant 216 speaking a start speech command such as "Adjust Pedal," or a similarly defined speech command, that is recognized by the speech recognizer 40 of controller 28. As described previously, this start speech command then initiates adjustment of the positioning of pedal arm 208 relative to the vehicle occupant 216. If no force input 22 is applied by the foot of vehicle occupant 216 to pedal pad 210, controller 28 will provide the motor actuator 34 with drive signals to initiate movement of pedal arm 208 in the fore direction toward vehicle occupant 216. If a force input 22 is applied by the foot of vehicle occupant 216 to pedal pad 210, the controller 28 will operate as previously described to enable adjustment in the positioning of pedal arm 208 in accordance with the magnitude of the applied force input 22. The adjustment can be terminated by the vehicle occupant 216 either: (i) removing a previously applied force input 22; (ii) maintaining the force input 22 in a predetermined range of force for a predetermined time; or (iii) speaking a recognized stop command, such as "Stop" or "Stop Pedal Adjustment."

Referring again to FIG. 4, an exemplary embodiment utilizing power seat 14' will now be described. Power seat 14' is used to support vehicle occupant 216 during the operation of vehicle 200, and includes a seat cushion 218, and a seat back 222 that is rotatably mounted to seat cushion 218 at pivot point A. Power seat 14' further includes a headrest 226, which extends from the seat back 222 by way of support posts 228 (one of which is shown in this view), and an arm rest 224 mounted to seat back 222. To simplify the drawing of FIG. 4, only one representative motor actuator 34' is shown for rotating seat back 222 about pivot point A to adjust the degree of tilt of seat back 222 relative to seat cushion 218. It will be understood that power seat 14' will generally include several additional motor actuators (not shown) to provide different adjustment features well known in the art.

A representative force sensor 24' is shown in FIG. 4 as being disposed in the seat back 222. For this exemplary embodiment, force sensor 24' is a pressure sensor mounted so as to measure a force input 22 provided by the vehicle occupant 216 who may be leaning back against the seat back 222.

Operation of the tilt adjustment for the seat back 222 of power seat 14' begins with the vehicle occupant 216 speaking a start speech command such as "Adjust Seat Tilt," or a similarly defined speech command recognized by the speech recognizer 40 of controller 28. This start speech command then initiates adjustment of the positioning of the tilt of seat back 222 relative to vehicle occupant 216 and the seat cushion 218. If no force input 22 is applied by the vehicle occupant 216 to the seat back 222, controller 28 will provide the motor actuator 34' with drive signals to initiate rotational movement of seat back 222 in a direction toward the back of vehicle occupant 216. If a measurable force input 22 is applied to the seat back 222, controller 28 will operate, as previously described, to enable vehicle occupant 216 to adjust the rotational position of seat back 222 in accordance with the magnitude of the applied force input 22. Such adjustment can then be terminated by the vehicle occupant 216 either: (i) removing the previously applied force input 22; (ii) maintaining the force input 22 in a predetermined range of force for a predetermined time; or (iii) speaking a recognized stop command, such as "Stop" or "Stop Seat Tilt Adjustment."

Figure 6:
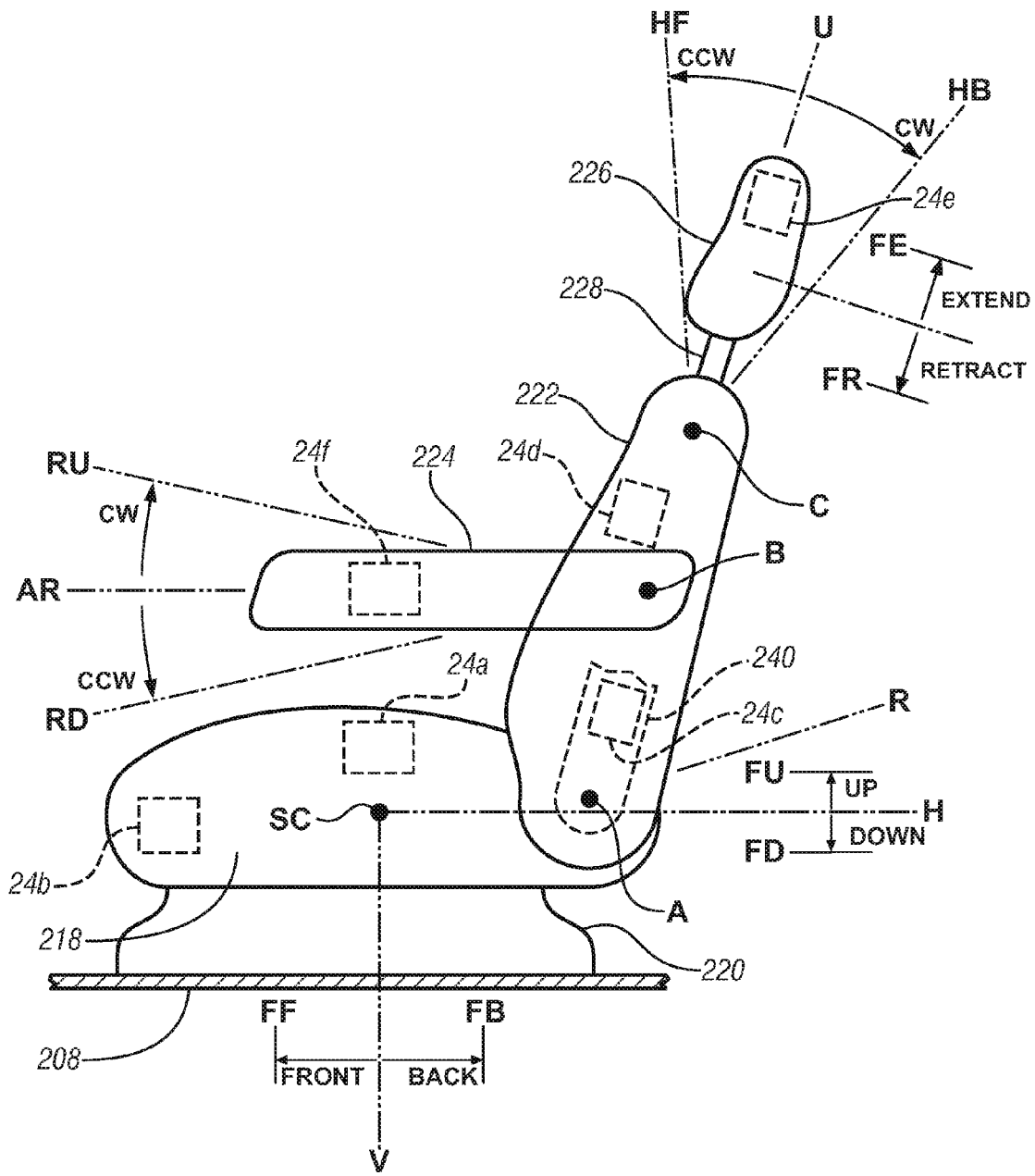
FIG. 6 illustrates different movable components of a vehicle power seat positioned in an exemplary embodiment.

FIG. 6 shows additional detail regarding other movable components of power seat 14' that can be similarly adjusted with motor actuators (not shown), as will now be described.

A plurality of force sensors 24a-24f are shown as being disposed at different locations in power seat 14' for measuring different force inputs that can be applied by vehicle occupant 216. For example, force sensor 24a, implemented as a pressure sensor, is located in seat cushion 218 for measuring a force input 22 applied by the buttocks of vehicle occupant 216 to the seat cushion 218. Force sensor 24b is implemented as a pressure sensor located in seat cushion 218 for measuring a horizontally directed force applied by the legs of vehicle occupant 216 to the front edge of seat cushion 218. Force sensor 24c may be implemented as a strain gauge mounted to a frame member 240 of seat back 222 for measuring the force applied by the back of seat occupant 216 to the seat back 222. As previously described, the force input 22, applied by vehicle occupant 216 to seat back 222, may alternative be measured by locating pressure sensor 24d in seat back 222. Force sensor 24e is shown mounted in the headrest 226, and can be positioned to measure: (i) a downward exerted force to the top headrest 226, applied, for example, by the hand of vehicle occupant 216; (ii) a horizontally directed force applied to headrest 226 by the back of the head of vehicle occupant 216; or (iii) components of each of these forces depending upon the orientation of force sensor 24e with respect to headrest 226. An additional force sensor 24f is shown positioned in armrest 224 for measuring a downwardly exerted force input 22 on armrest 224 applied, for example, by the arm and/or hand of vehicle occupant 216.

By measuring the force input 22 applied to the above described force sensors 24a-24f, it will be understood from the previous description that the principles of the present disclosure can be applied to provide adjustment of the various movable components of power seat 14'. For example, the center of seat cushion 218 (designated as SC) can be moved horizontally along line H, in the indicated front and back directions between positions FF and FB, in accordance with a force input 22 applied to: (i) the seat cushion 218 by the legs of vehicle occupant 216 and measured by force sensor 24b; or (ii) the seat back 222 by the back of vehicle occupant 216, as measured by either force sensor 24c or force sensor 24d. Likewise, the center SC of seat cushion 218 can be moved vertically along line V in the indicated up and down directions between positions FU and FD in accordance with a force input 22 applied to: (i) the seat cushion 218 by the buttocks of vehicle occupant 216 measured by force sensor 24a; or (ii) the seat back 222 by vehicle occupant 216, as measured by either force sensor 24c or force sensor 24d.

In some applications, the seat cushion 218 may contain multiple motor actuators for separately raising and lowering front and rear portions of seat cushion 218. In this type of application, a single pressure sensor 24a is usually not practical for adjusting both such seat cushion motor actuators. Separate force sensors can be implemented for adjusting each of the front and rear portions of seat cushion 218, for example, force sensors 24f and 24d can be used for such adjustments. A single force sensor can be used, but the adjustment of each seat cushion portion will require a different defined start commands such as "Adjust Front Seat Cushion Portion," and "Adjust Rear Seat Cushion Portion."

It will be understood that the present disclosure can be implemented to provide additional adjustments of power seat 14' including: (i) moving arm rest 224 about pivot point B in clockwise (CW) and counterclockwise (CCW) between angular positions indicated by lines RU and RD, in accordance with a force input 22 measured by force sensor 24f; (ii) moving headrest 226 in CW and CCW rotational directions about pivot point C between angular positions indicated by lines HF and FB, in accordance with a force input 22 measured by force sensor 24e as applied by the back of the head of vehicle occupant 216; and (iii) moving headrest 226 in along line U in the indicated extend and retract directions between positions FE and FR based upon a force input 22 applied in downward direction on headrest 226 along line U as measured by force sensor 24e. As described previously with respect to FIG. 4, seat back 222 can be moved in CW and CCW rotational directions about pivot point A between an angular upright position indicated by line U, and a fully reclined position indicated by line R.

Figure 7:
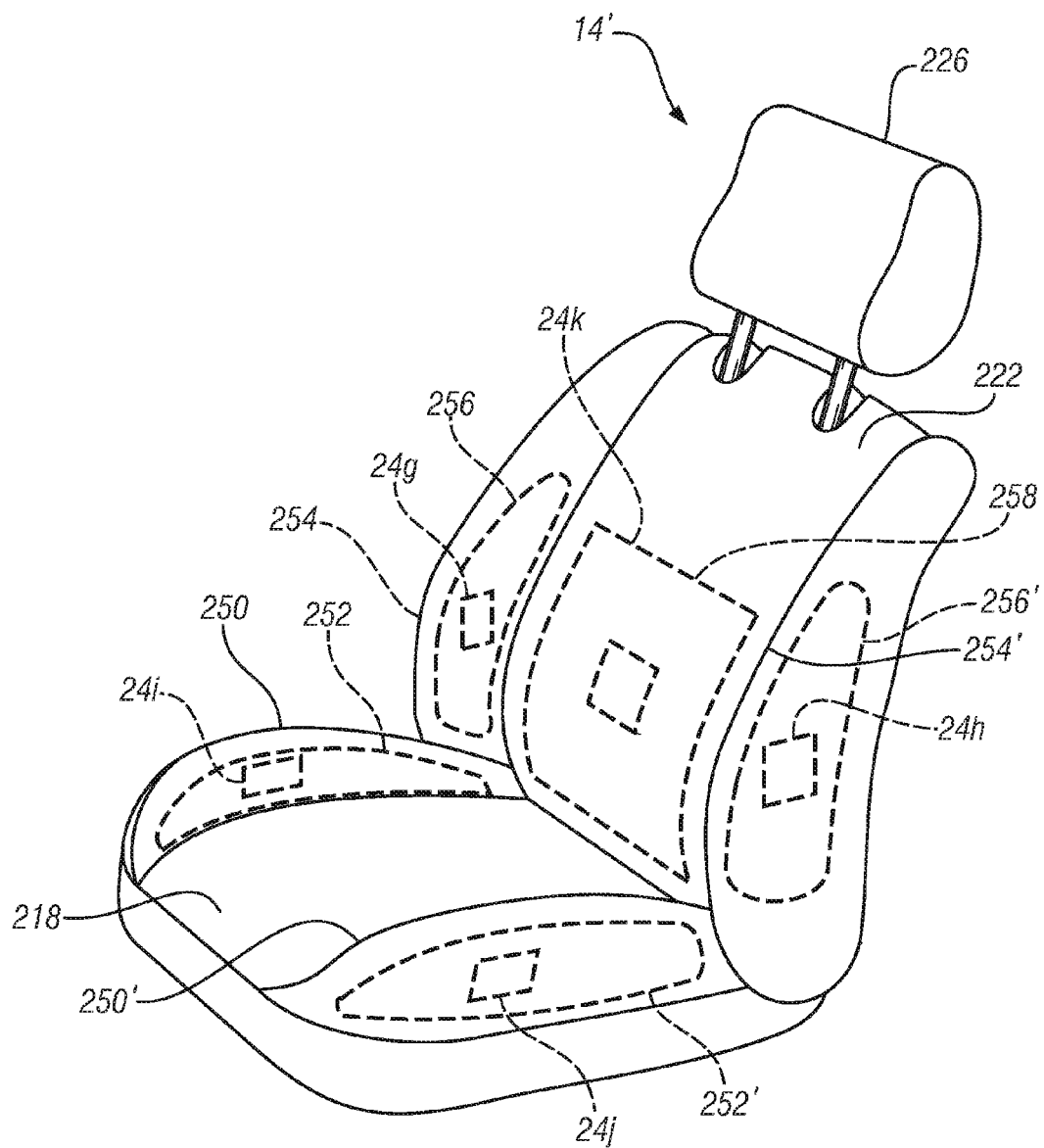
FIG. 7 shows additional movable components of the vehicle power seat of FIG. 6 in an exemplary embodiment.

Turning now to FIG. 7 additional implementations for adjusting further movable components 12 of power seat 14' will now be described. As is known in the vehicle seating art, some power seats 14' are equipped with adjustable lateral bolsters 250 and 250' that form a portion of seat cushion 218, and/or adjustable lateral bolsters 254 and 254' that form a portion of seat back 222. By means of known motor actuated bolster mechanisms 252, 252', 256 and 256', these lateral bolsters 250, 250', 254, and 254' are moved (typically rotated) either inwardly toward a vehicle occupant 216 positioned in the power seat 14', or outwardly away from the vehicle occupant 216. Accordingly, by placing force sensors 24g-24j (pressure sensors for example) in the respective lateral bolsters, the increase in force (or pressure) can be measured as the lateral bolsters are moved inwardly to contact the body of the vehicle occupant 216. The magnitude of the force measured by force sensors 24g-24j can then be used for adjusting the positioning of the lateral bolsters 250, 250', 254 and 254', either individually, as separate pairs, or as an entire group, based upon force signals provided by one or more of the force sensors 24g-24j. Alternatively, the lateral bolsters 250, 250', 254 and 254' can all be positioned in accordance with a force input 22 applied by the back of vehicle occupant 216 to the seat back 222 as measured by force sensors 24c, 24d or 24k disposed in seat back 222.

FIG. 7 illustrates one additional movable component 258, known as an adjustable lumbar support mechanism, located in seat back 222. Lumbar support mechanism 258 is typically moved by a motor actuator (not shown) to provide different support positions for the lumbar region of the back of vehicle occupant 216 while sitting in power seat 14'. Accordingly, by measuring a force input 22 applied to a force sensor 24f located in seat back 222, the present disclosure can be utilized for adjusting the positioning of the lumbar support mechanism in accordance with the magnitude of the force applied by occupant 216 to the back of seat back 222. As described previously, force sensor 24c, which is mounted on the frame 240 of seat back 222 could also be used to measure the magnitude of force applied by the vehicle occupant 222 to the back of seat 14'. Alternatively, any of the other force sensors located as previously described could be used to measure a force input 22 applied by the vehicle occupant 216 for adjusting the positioning the lumbar support mechanism 258.

While certain exemplary embodiments and implementations have been described, it will be understood that numerous changes can be made. For example, certain exemplary embodiments have been described affecting position movable components of motor actuated vehicle accessories. The applications are not limited to such vehicle accessories and can be used for adjusting the position of movable components in any type of motor actuated device.

Also, the previously described embodiments have all utilized a speech sensor and speech recognizer for receiving voice commands input by the device user to provide adjustment activation and deactivation commands to initiate and terminate the positioning of the movable component of the motor actuated device. It will be understood that these activation and deactivation functions can be accomplished by other means. For example, if the elimination of switches is not a critical requirement for the particular application or if such switches are desired for redundancy, the activation and deactivation commands can be provided by push button switches, touch screens, or any other type of sensors or input devices known in the art to initiate and terminate the adjustment of the positioning of the movable component in accordance with the force input provided by the user of the motor actuated device.

Accordingly, it is intended that the invention not be limited by the disclosed embodiments, but have the full scope permitted by the language of the following claims.

The invention claimed is:

1. An apparatus for positioning a movable component of a device, the apparatus comprising:
   a speech sensor receiving a speech input provided by a user of the device;
   a force sensor measuring a magnitude of a force input applied by the user of the device;
   a controller coupled to the speech sensor and the force sensor, the controller receiving the force input and the speech input; and,
   a motor actuator coupled to the controller, the motor actuator adjusting positioning of the movable component based on motor drive signals from the controller, the motor drive signals only initiated in response to the speech input provided by the user of the device, wherein the motor drive signals effectuate adjustment of the movable component to achieve a position desired by the user based on the magnitude of the force input applied by the user of the device, the adjustment of the movable component is terminated when the magnitude of the force input applied by the user of the device has a magnitude greater than a first predetermined amount of force and less than a second predetermined amount of force for a predetermined period of time.

2. The apparatus of claim 1, wherein the speech input comprises a start speech command that initiates adjustment of the positioning of the movable component by the controller.

3. The apparatus of claim 1, wherein the speech input comprises a stop speech command that terminates adjustment of the positioning of the movable component by the controller.

4. The apparatus of claim 1, wherein the movable component is moved in a first direction when the magnitude of the force input applied by the user of the device has a magnitude less than a defined amount of force, and in a second direction when the magnitude of the force input is greater than the defined amount of force.

5. The apparatus of claim 2, wherein after the start speech command is received, the movable component is moved in a first direction when the magnitude of the force input applied by the user of the device has a magnitude less than the first predetermined amount of force, and in a second direction when the magnitude of the force input is greater than the second predetermined amount of force.

6. The apparatus of claim 5, wherein movement of the movable component is halted when the magnitude of the force input applied by the user of the device is greater than the first predetermined amount of force and less than the second predetermined amount of force.

7. The apparatus of claim 1, wherein adjustment of the positioning of the movable component is terminated when the user of the device applies, and then removes the force input.

8. The apparatus of claim 1, wherein the magnitude of the force input provided by the user of the device is applied to the movable component to oppose movement in a first direction and to assist movement in a second direction.

9. The apparatus of claim 1, wherein said device is a vehicle adjustable pedal assembly and said movable component comprises a pedal arm.

10. The apparatus of claim 1, wherein said device is a vehicle power seat and said movable component comprises at least one of a seat cushion, a seat back, a seat armrest, a seat headrest, an adjustable lateral bolster, and an adjustable lumbar support mechanism.

11. A method for positioning a movable component of a motor actuated device, the method comprising:
   receiving speech input provided by a user of the motor actuated device;
   measuring a magnitude of a force input provided by the user of the motor actuated device, wherein the measured magnitude of the force input determines required directional movement of the movable component to achieve a position of the movable component desired by the user based on the magnitude of the force input; and,
   controlling the motor actuated device to position the movable component based on motor drive signals, the motor drive signals only initiated in response to the speech input provided by the user of the motor actuated device, wherein the motor drive signals effectuate adjustment of the movable component to achieve the position desired by the user based on the magnitude of the force input applied by the user of the device, the adjustment of the movable component is terminated when the magnitude of the force input applied by the user of the device has a magnitude greater than a first predetermined amount of force and less than a second predetermined amount of force for a predetermined period of time.

12. The method of claim 11, wherein the speech input comprises a first speech command that initiates adjustment of the positioning of the movable component.

13. The method of claim 12, wherein the speech input comprises a second speech command for terminating adjustment of the positioning of the movable component.

14. The method of claim 11, wherein the movable component is moved in a first direction when the magnitude of the force input has a magnitude less than the first predetermined amount of force and in a second direction when the magnitude of the force input is greater than the second predetermined amount of force.

15. The method of claim 14, wherein the first predetermined amount of force is less than the second predetermined amount of force.

16. The method of claim 14, wherein the first predetermined amount of force is equal to the second predetermined amount of force.

17. The method of claim 15, wherein movement of the movable component is halted when the magnitude of the force input is greater than the first predetermined amount of force and less than the second predetermined amount of force.

18. The method of claim 11, wherein adjustment of the positioning of the movable component is terminated when the user of the motor actuated device applies and then removes the force input.

19. The method of claim 11, wherein said motor actuated device is a vehicle adjustable pedal mechanism and said movable component comprises a pedal arm.

20. The method of claim 11, wherein said motor actuated device is a vehicle power seat and the movable component comprises at least one of a seat cushion, a seat back, a seat armrest, a seat headrest, an adjustable lateral bolster, and an adjustable lumbar support mechanism.

21. A method for positioning a movable component of a motor actuated device, the method comprising:
receiving an adjustment activation command initiating adjustment of the movable component;
measuring a magnitude of a force input provided by the user of the motor actuated device, wherein the measured magnitude of the force input determines required directional movement of the movable component to achieve a position of the movable component desired by the user based on the magnitude of the force input;
controlling the motor actuated device to move the movable component in a first direction when the magnitude of the force input has a magnitude less than a first predetermined amount of force, and in a second direction when the magnitude of the force input is greater than a second predetermined amount of force; and
wherein controlling the motor actuated device to move the movable component is based on motor drive signals only initiated in response to the adjustment activation command, the motor drive signals effectuate adjustment of the movable component to achieve the position desired by the user based on the magnitude of the force input provided by the user of the motor actuated device, the adjustment of the movable component is terminated when the magnitude of the force input applied by the user of the device has a magnitude greater than a first predetermined amount of force and less than a second predetermined amount of force for a predetermined period of time.

22. The method of claim 21, further including:
receiving an adjustment deactivation command to terminate adjustment of the positioning of the movable component.

23. The method of claim 21, wherein the first predetermined amount of force is less than the second predetermined amount of force and movement of the movable component is halted when the magnitude of the force input is greater that the first predetermined amount of force and less than the second predetermined amount of force.

24. The method of claim 21, wherein the first predetermined amount of force is less than the second predetermined amount of force.

25. The method of claim 21, wherein the first predetermined amount of force is less than the second predetermined amount of force and movement of the movable component is halted when the magnitude of the force input is greater that the first predetermined amount of force and less than the second predetermined amount of force.

26. The method of claim 21, wherein adjustment of the positioning of the movable component is terminated when the user of the motor actuated device applies and then removes the force input.

27. The method of claim 21, wherein said motor actuated device is a vehicle adjustable pedal mechanism and said movable component comprises a pedal arm.

28. The method of claim 21, wherein said motor actuated device is a vehicle power seat and the movable component comprises at least one of a seat cushion, a seat back, a seat armrest, a seat headrest, an adjustable lateral bolster, and an adjustable lumbar support mechanism.

29. The method of claim 27, wherein said pedal arm of said vehicle adjustable pedal mechanism is moved in the first direction if the magnitude of the force input is greater than a defined amount of force and in the second direction if the magnitude of the force input is less than the defined amount of force, where the defined amount of force is greater than the first predetermined amount of force and less than the second predetermined amount of force.

* * * * *